United States Patent
Nair et al.

(10) Patent No.: US 11,636,281 B2
(45) Date of Patent: Apr. 25, 2023

(54) MODEL MANAGEMENT SYSTEM FOR DEVELOPING MACHINE LEARNING MODELS

(71) Applicant: Visa International Service Association, San Francisco, CA (US)

(72) Inventors: Vivek Narayanan Nair, North York (CA); Anubhav Narang, Singapore (SG); Lubna Akhtar, Singapore (SG); Dhirender Singh Rathore, Singapore (SG); Ayush Manohar Babu Khokale, Singapore (SG); Keyuan Wu, Singapore (SG)

(73) Assignee: Visa International Service Association, San Francisco, CA (US)

( * ) Notice: Subject to any disclaimer, the term of this patent is extended or adjusted under 35 U.S.C. 154(b) by 1036 days.

(21) Appl. No.: 16/393,337

(22) Filed: Apr. 24, 2019

(65) Prior Publication Data

US 2019/0325271 A1 Oct. 24, 2019

Related U.S. Application Data

(60) Provisional application No. 62/661,800, filed on Apr. 24, 2018.

(51) Int. Cl.
*G06K 9/62* (2022.01)
*G06N 20/00* (2019.01)
*G06Q 20/40* (2012.01)

(52) U.S. Cl.
CPC ......... *G06K 9/6257* (2013.01); *G06K 9/6267* (2013.01); *G06K 9/6298* (2013.01); *G06N 20/00* (2019.01); *G06Q 20/4015* (2020.05)

(58) Field of Classification Search
None
See application file for complete search history.

(56) References Cited

U.S. PATENT DOCUMENTS 10,497,250 B1 * 12/2019 Hayward ................. G10L 15/26
2014/0236678 A1 * 8/2014 Akerman ............ G06F 16/9537
705/7.34

* cited by examiner

*Primary Examiner* — John B Strege
*Assistant Examiner* — Elisa M Rice
(74) *Attorney, Agent, or Firm* — The Webb Law Firm

(57) ABSTRACT

Provided is a method for developing a geographic agnostic machine learning model. The method may include selecting transaction data associated with payment transactions conducted by a first plurality of users, wherein the transaction data includes first transaction data associated with payment transactions conducted by a first plurality of users in a first geographic area and second transaction data associated with payment transactions conducted by a second plurality of users in a second geographic area, formatting the first transaction data associated with payment transactions conducted by the first plurality of users in the first geographic area and the second transaction data associated with payment transactions conducted by the second plurality of users in the second geographic area to provide training data, and generating the geographic agnostic machine learning model using the training data. A system and computer program product are also disclosed.

14 Claims, 10 Drawing Sheets

MODEL MANAGEMENT SYSTEM FOR DEVELOPING MACHINE LEARNING MODELS

CROSS-REFERENCE TO RELATED APPLICATIONS

This application claims the benefit of U.S. Provisional Patent Application No. 62/661,800, filed Apr. 24, 2018, the disclosure of which is hereby incorporated in its entirety.

BACKGROUND

1. Technical Field

This present disclosure relates generally to systems, devices, computer program products, apparatus, and methods that are used for developing machine learning models and, in one particular embodiment, to a system, computer program product, and method for developing a geographic agnostic machine learning model.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data.

However, a machine learning model developed for one set of data may not be applicable to a certain problem in another set of data. For example, a machine learning model developed for a first data set associated with a particular geographic area and/or demographic may not be applicable to a certain problem in a second set of data associated with a different geographic area and/or demographic. This may lead to the creation of large number of machine learning models developed for each set of data and also a large amount of data for each machine learning model.

SUMMARY

Accordingly, systems, devices, computer program products, apparatus, and/or methods for developing a geographic agnostic machine learning model are disclosed that overcome some or all of the deficiencies of the prior art.

According to a non-limiting embodiment, provided is a system for developing a geographic agnostic machine learning model, the system comprises at least one processor programmed or configured to select transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area; format the first transaction data associated with payment transactions conducted by the first plurality of users in the first geographic area and the second transaction data associated with payment transactions conducted by the second plurality of users in the second geographic area to provide geographic agnostic transaction data associated with payment transactions; generate a geographic agnostic machine learning model using training data, wherein the training data comprises the geographic agnostic transaction data associated with payment transactions; generate a generalization layer based on data associated with macro-economic factors of the first geographic area and data associated with macro-economic factors of the second geographic area; apply an input to the generalization layer to provide an output of the generalization layer; and provide the output of the generalization layer as an input to the geographic agnostic machine learning model.

According to a non-limiting embodiment, provided is a computer program product for developing a geographic agnostic machine learning model, the computer program product comprising at least one non-transitory computer-readable medium including one or more instructions that, when executed by at least one processor, cause the at least one processor to select transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area; format the first transaction data associated with payment transactions conducted by the first plurality of users in the first geographic area and the second transaction data associated with payment transactions conducted by the second plurality of users in the second geographic area to provide geographic agnostic transaction data associated with payment transactions; generate a geographic agnostic machine learning model using training data, wherein the training data comprises the geographic agnostic transaction data associated with payment transactions; generate a generalization layer based on data associated with macro-economic factors of the first geographic area and data associated with macro-economic factors of the second geographic area; apply an input to the generalization layer to provide an output of the generalization layer; and provide the output of the generalization layer as an input to the geographic agnostic machine learning model.

According to a non-limiting embodiment, provided is a computer-implemented method for developing a geographic agnostic machine learning model, the method comprising: selecting, with at least one processor, transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area; formatting, with at least one processor, the first transaction data associated with payment transactions conducted by the first plurality of users in the first geographic area and the second transaction data associated with payment transactions conducted by the second plurality of users in the second geographic area to provide training data; generating, with at least one processor, the geographic agnostic machine learning model using the training data; and optimizing, with at least one processor, the geographic agnostic machine learning model after generating the geographic agnostic machine learning model.

Clause 1: A system for developing a geographic agnostic machine learning model, the system comprising: at least one processor programmed or configured to: select transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area; format the first transaction data associated with payment transactions conducted by the first plurality of users in the first geographic area and the second transaction data associated with payment transactions conducted by the second plurality of users in the second geographic area to provide geographic agnostic transaction data associated with payment transactions; generate a geographic agnostic machine learning model using training data, wherein the training data comprises the geographic agnostic transaction data associated with payment transactions; generate a generalization layer based on data associated with macro-economic factors of the first geographic area and data associated with macro-economic factors of the second geographic area; apply an input to the generalization layer to provide an output of the generalization layer; and provide the output of the generalization layer as an input to the geographic agnostic machine learning model.

Clause 2: The system of clause 1, wherein the at least one processor is further programmed or configured to: determine a classification of the input using the geographic agnostic machine learning model.

Clause 3: The system of clause 1, wherein the at least one processor is further programmed or configured to: optimize the geographic agnostic machine learning model after generating the geographic agnostic machine learning model.

Clause 4: The system of any preceding clause, wherein, when formatting the first transaction data associated with payment transactions conducted by the first plurality of users in the first geographic area and the second transaction data associated with payment transactions conducted by the second plurality of users in the second geographic area, the at least one processor is programmed or configured to: normalize the first transaction data associated with payment transactions conducted by the first plurality of users in the first geographic area and the second transaction data associated with payment transactions conducted by the second plurality of users in the second geographic area.

Clause 5: The system of any preceding clause, wherein, when normalizing the first transaction data associated with payment transactions conducted by the first plurality of users in the first geographic area and the second transaction data associated with payment transactions conducted by the second plurality of users in the second geographic area, the at least one processor is programmed or configured to: perform a normalization technique on the first transaction data associated with payment transactions conducted by the first plurality of users in the first geographic area and the second transaction data associated with payment transactions conducted by the second plurality of users in the second geographic area.

Clause 6: The system of any preceding clause, wherein, when normalizing the first transaction data associated with payment transactions conducted by the first plurality of users in the first geographic area and the second transaction data associated with payment transactions conducted by the second plurality of users in the second geographic area, the at least one processor is programmed or configured to: normalize feature data associated with one or more features associated with payment transactions conducted by the first plurality of users in the first geographic area and feature data associated with one or more features associated with payment transactions conducted by the second plurality of users in the second geographic area.

Clause 7: The system of any preceding clause, wherein, when normalizing the first transaction data associated with payment transactions conducted by the first plurality of users in the first geographic area and the second transaction data associated with payment transactions conducted by the second plurality of users in the second geographic area, the at least one processor is programmed or configured to: perform a de-weighting technique on the first transaction data associated with payment transactions conducted by the first plurality of users in the first geographic area and the second transaction data associated with payment transactions conducted by the second plurality of users in the second geographic area.

Clause 8: A computer program product for developing a geographic agnostic machine learning model, the computer program product comprising at least one non-transitory computer-readable medium including one or more instructions that, when executed by at least one processor, cause the at least one processor to: select transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area; format the first transaction data associated with payment transactions conducted by the first plurality of users in the first geographic area and the second transaction data associated with payment transactions conducted by the second plurality of users in the second geographic area to provide geographic agnostic transaction data associated with payment transactions; generate a geographic agnostic machine learning model using training data, wherein the training data comprises the geographic agnostic transaction data associated with payment transactions; generate a generalization layer based on data associated with macro-economic factors of the first geographic area and data associated with macro-economic factors of the second geographic area; apply an input to the generalization layer to provide an output of the generalization layer; and provide the output of the generalization layer as an input to the geographic agnostic machine learning model.

Clause 9: The computer program product of clause 8, wherein the one or more instructions further cause the at least one processor to: optimize the geographic agnostic machine learning model after generating the geographic agnostic machine learning model.

Clause 10: The computer program product of clauses 8 or 9, wherein the one or more instructions that cause the at least one processor to format the first transaction data associated with payment transactions conducted by the first plurality of users in the first geographic area and the second transaction data associated with payment transactions conducted by the second plurality of users in the second geographic area cause the at least one processor to: normalize the first transaction data associated with payment transactions conducted by the first plurality of users in the first geographic area and the second transaction data associated with payment transactions conducted by the second plurality of users in the second geographic area.

Clause 11: The computer program product of any of clauses 8-10, wherein the one or more instructions that cause the at least one processor to normalize the first transaction data associated with payment transactions conducted by the first plurality of users in the first geographic area and the second transaction data associated with payment transactions conducted by the second plurality of users in the second geographic area cause the at least one processor to: perform a normalization technique on the first transaction data associated with payment transactions conducted by the first plurality of users in the first geographic area and the second transaction data associated with payment transactions conducted by the second plurality of users in the second geographic area.

Clause 12: The computer program product of any of clauses 8-11, wherein the one or more instructions that cause the at least one processor to normalize the first transaction data associated with payment transactions conducted by the first plurality of users in the first geographic area and the second transaction data associated with payment transactions conducted by the second plurality of users in the second geographic area cause the at least one processor to: normalize feature data associated with one or more features associated with payment transactions conducted by the first plurality of users in the first geographic area and feature data associated with one or more features associated with payment transactions conducted by the second plurality of users in the second geographic area.

Clause 13: The computer program product of any of clauses 8-12, wherein the one or more instructions further cause the at least one processor to normalize the first transaction data associated with payment transactions conducted by the first plurality of users in the first geographic area and the second transaction data associated with payment transactions conducted by the second plurality of users in the second geographic area, cause the at least one processor to: perform a de-weighting technique on the first transaction data associated with payment transactions conducted by the first plurality of users in the first geographic area and the second transaction data associated with payment transactions conducted by the second plurality of users in the second geographic area.

Clause 14: A computer-implemented method for developing a geographic agnostic machine learning model, the method comprising: selecting, with at least one processor, transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area; formatting, with at least one processor, the first transaction data associated with payment transactions conducted by the first plurality of users in the first geographic area and the second transaction data associated with payment transactions conducted by the second plurality of users in the second geographic area to provide training data; generating, with at least one processor, the geographic agnostic machine learning model using the training data; and generating, with at least one processor, a generalization layer based on data associated with macro-economic factors of the first geographic area and data associated with macro-economic factors of the second geographic area.

Clause 15: The computer-implemented method of clause 14, wherein formatting the first transaction data associated with payment transactions conducted by the first plurality of users in the first geographic area and the second transaction data associated with payment transactions conducted by the second plurality of users in the second geographic area comprises: normalizing the first transaction data associated with payment transactions conducted by the first plurality of users in the first geographic area and the second transaction data associated with payment transactions conducted by the second plurality of users in the second geographic area.

Clause 16: The computer-implemented method of clauses 14 or 15, wherein normalizing the first transaction data associated with payment transactions conducted by the first plurality of users in the first geographic area and the second transaction data associated with payment transactions conducted by the second plurality of users in the second geographic area comprises: performing a normalization technique on the first transaction data associated with payment transactions conducted by the first plurality of users in the first geographic area and the second transaction data associated with payment transactions conducted by the second plurality of users in the second geographic area, wherein the normalization technique comprises: a Z-score technique, a binning technique, a min-max normalization technique, or any combination thereof.

Clause 17: The computer-implemented method of any of clauses 14-16, wherein normalizing the first transaction data associated with payment transactions conducted by the first plurality of users in the first geographic area and the second transaction data associated with payment transactions conducted by the second plurality of users in the second geographic area comprises: normalizing one or more features associated with payment transactions conducted by the first plurality of users in the first geographic area and one or more features associated with payment transactions conducted by the second plurality of users in the second geographic area.

Clause 18: The computer-implemented method of any of clauses 14-17, wherein normalizing the first transaction data associated with payment transactions conducted by the first plurality of users in the first geographic area and the second transaction data associated with payment transactions conducted by the second plurality of users in the second geographic area comprises: performing a de-weighting technique on the first transaction data associated with payment transactions conducted by the first plurality of users in the first geographic area and the second transaction data associated with payment transactions conducted by the second plurality of users in the second geographic area.

Clause 19: The computer-implemented method of any of clauses 14-18, further comprising: optimizing the geographic agnostic machine learning model after generating the geographic agnostic machine learning model.

Clause 20: The computer-implemented method of any of clauses 14-19, further comprising: applying an input to the generalization layer to provide an output of the generalization layer; and providing the output of the generalization layer as an input to the geographic agnostic machine learning model.

Characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
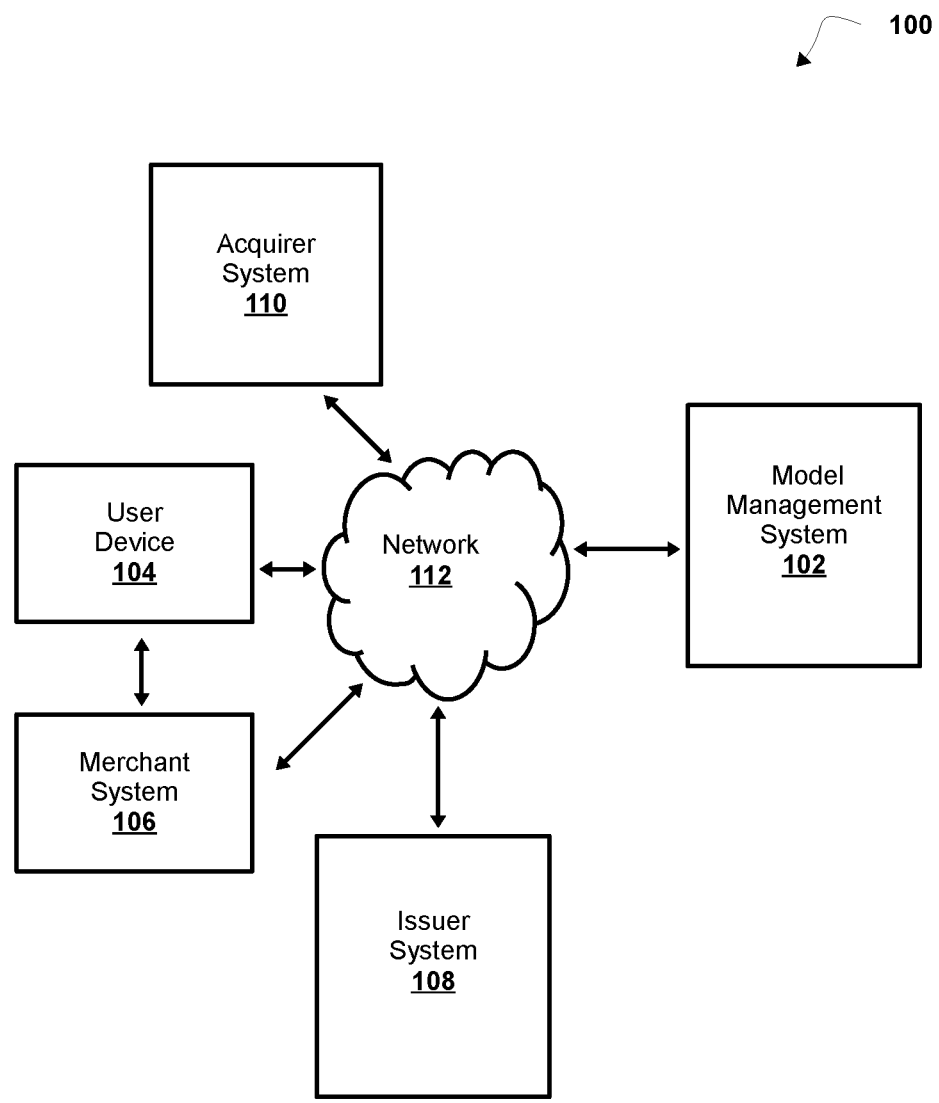
FIG. 1 is a diagram of a non-limiting embodiment of an environment in which systems, devices, computer program products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the present disclosure as it is oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information and communicates the processed information to the second unit. In some non-limiting embodiments, a message may refer to a packet (e.g., a data packet, a network packet, and/or the like) that includes data.

As used herein, the term "account identifier" may refer to one or more types of identifiers associated with a user account (e.g., an account identifier, a primary account number (PAN), a card number, a payment card number, a token, and/or the like). In some non-limiting embodiments, an issuer may provide an account identifier (e.g., a PAN, a token, and/or the like) to a user that uniquely identifies one or more accounts associated with that user. The account identifier may be embodied on a physical payment device instrument (e.g., a portable payment device, a payment card, a credit card, a debit card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "POS system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein, the term "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a personal account number (PAN), to a user that uniquely identifies one or more accounts associated with the user. The account identifier may be used by the user to conduct a payment transaction. In some non-limiting embodiments, the account identifier may be embodied on a portable payment device, such as a payment card and/or may be electronic and used for electronic payment transactions. In some non-limiting embodiments, an issuer may be associated with a bank identification number (BIN) that uniquely identifies the issuer. As used herein, the term "issuer system" may refer to one or more systems operated by or operated on behalf of an issuer. For example, an issuer system may refer to a server executing one or more software applications associated with the issuer. In some non-limiting embodiments, an issuer system may include one or more servers (e.g., one or more authorization servers) for authorizing a payment transaction.

As used herein, the term "acquirer" may refer to an entity licensed by a transaction service provider and approved by the transaction service provider to originate payment transactions using a payment device associated with the transaction service provider. As used herein, the term "acquirer system" may also refer to one or more computer systems, computer devices, and/or the like operated by or on behalf of an acquirer. The payment transactions the acquirer may originate may include payment transactions (e.g., purchases, original credit transactions (OCTs), account funding transactions (AFTs), and/or the like). In some non-limiting embodiments, the acquirer may be authorized by a transaction service provider to assign merchant or service providers (e.g. payment gateways) to originate transactions using a payment device of the transaction service provider. The acquirer may contract with payment facilitators to enable the payment processors to sponsor merchants. The acquirer may monitor compliance of the payment processors in accordance with regulations of the transaction service provider. The acquirer may conduct due diligence of the payment processors and ensure proper due diligence occurs before signing a sponsored merchant. The acquirer may be liable for all transaction service provider programs that the acquirer operates or sponsors. The acquirer may be responsible for the acts of the acquirer's payment processors, merchants that are sponsored by the acquirer's payment processors, and/or the like. In some non-limiting embodiments, an acquirer may be a financial institution, such as a bank.

As used herein, the term "client device" may refer to one or more devices (e.g., client-side devices) or one or more systems (e.g., client-side systems), which are remote from a server, used to access a functionality provided by the server. For example, a client device may include one or more computing devices (e.g., one or more computing machines, one or more computers, one or more processors, one or more information processing systems, and/or the like), cellular phones, smartphones, wearable devices (e.g., watches, glasses, lenses, clothing, and/or the like), personal digital assistants (PDAs), and/or the like.

As used herein, the term "server" may refer to one or more devices that provide a functionality to one or more devices (e.g., one or more client devices) via a network (e.g., a public network, a private network, the Internet, and/or the like). For example, a server may include one or more computing devices.

As used herein, the term "system" may refer to one or more devices (e.g., a group of devices) that are connected or are configured to be connected with one or more other devices. For example, a system may include a plurality of computing devices that include software applications, where the plurality of computing devices are connected via a network.

In some non-limiting embodiments, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, methods, and computer program products for developing a geographic agnostic machine learning model. According to non-limiting embodiments of the present disclosure, a geographic agnostic machine learning model may be developed based on transaction data associated with payment transactions conducted by a plurality of users in a plurality of geographic areas. In this way, the geographic agnostic machine learning model may be applicable to a plurality of geographic areas and may have the same performance in terms of accuracy of a result (e.g., a classification, a prediction, and/or the like) when compared to a particular machine learning model developed based on each geographic area of the plurality of geographic areas. In addition, embodiments of the present disclosure improve efficiency and scalability of a machine learning model by providing a geographic agnostic machine learning model that may be used on all sets of data of a plurality of sets of data for a plurality of geographic areas instead of producing a machine learning model for each set of data of the plurality of sets of data.

Referring now to FIG. 1, FIG. 1 is a diagram of an example environment 100 in which devices, systems, and/or methods, described herein, may be implemented. As shown in FIG. 1, environment 100 includes model management system 102, user device 104, merchant system 106, issuer system 108, acquirer system 110, and network 112. Merchant system 106 and/or user device 104 may interconnect (e.g., establish a connection to communicate) via wired connections, wireless connections, or a combination of wired and wireless connections.

Model management system 102 may include one or more devices capable of being in communication with user device 104, merchant system 106, issuer system 108, and/or acquirer system 110 via network 112. For example, model management system 102 may include one or more computing devices, such as a server (e.g., a transaction processing server), a group of servers, and/or other like devices. In some non-limiting embodiments, model management system 102 may be associated with a financial institution, a transaction service provider, and/or an issuer as described herein. For example, model management system 102 may be operated by a financial institution, a transaction service provider, and/or an issuer. In some non-limiting embodiments, model management system 102 may include acquirer system 110. For example, acquirer system 110 may be a component of model management system 102.

User device 104 may include one or more devices capable of being in communication with model management system 102, merchant system 106, issuer system 108, and/or acquirer system 110 via network 112. For example, user device 104 may include one or more computing devices, such as one or more servers, one or more routers, one or more modems, one or more desktop computers, one or more portable computers (e.g., one or more tablet computers, one or more laptop computers, and/or the like), one or more mobile devices (e.g., cellular phones, smartphones, PDAs, and/or the like), and/or the like.

Merchant system 106 may include one or more devices capable of being in communication with model management system 102, user device 104, issuer system 108, and/or acquirer system 110 via network 112. Merchant system 106 may also include a device capable of receiving information from user device 104 via network 112, a communication connection (e.g., an NFC communication connection, an RFID communication connection, a Bluetooth® communication connection, and/or the like) with user device 104, and/or the like, and/or communicating information to user device 104 via network 112, the communication connection, and/or the like. For example, merchant system 106 may include a computing device, such as a server, a group of servers, a client device, a group of client devices, and/or other like devices. In some non-limiting embodiments, merchant system 106 may be associated with a merchant as described herein. In some non-limiting embodiments, merchant system 106 may include one or more user devices 104. For example, merchant system 106 may include user device 104 that allows a merchant to communicate information to a transaction service provider system. In some non-limiting embodiments, merchant system 106 may include one or more devices, such as computers, computer systems, and/or peripheral devices capable of being used by a merchant to conduct a payment transaction with a user. For example, merchant system 106 may include a POS device and/or a POS system.

Issuer system 108 may include one or more devices capable of being in communication with model management system 102, user device 104, merchant system 106, and/or acquirer system 110 via network 112. For example, issuer system 108 may include a computing device, such as a server, a group of servers, and/or other like devices. In some non-limiting embodiments, issuer system 108 may be associated with an issuer as described herein. For example, issuer system 108 may be associated with an issuer that issued a credit account, debit account, credit card, debit card, and/or the like to a user associated with user device 104.

Acquirer system 110 may include one or more devices capable of being in communication with model management system 102, user device 104, merchant system 106, and/or issuer system 108 via network 112. For example, acquirer system 110 may include one or more computing devices, such as one or more servers, one or more routers, one or more modems, one or more desktop computers, one or more portable computers (e.g., one or more tablet computers, one or more laptop computers, and/or the like), one or more mobile devices (e.g., cellular phones, smartphones, PDAs, and/or the like), and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
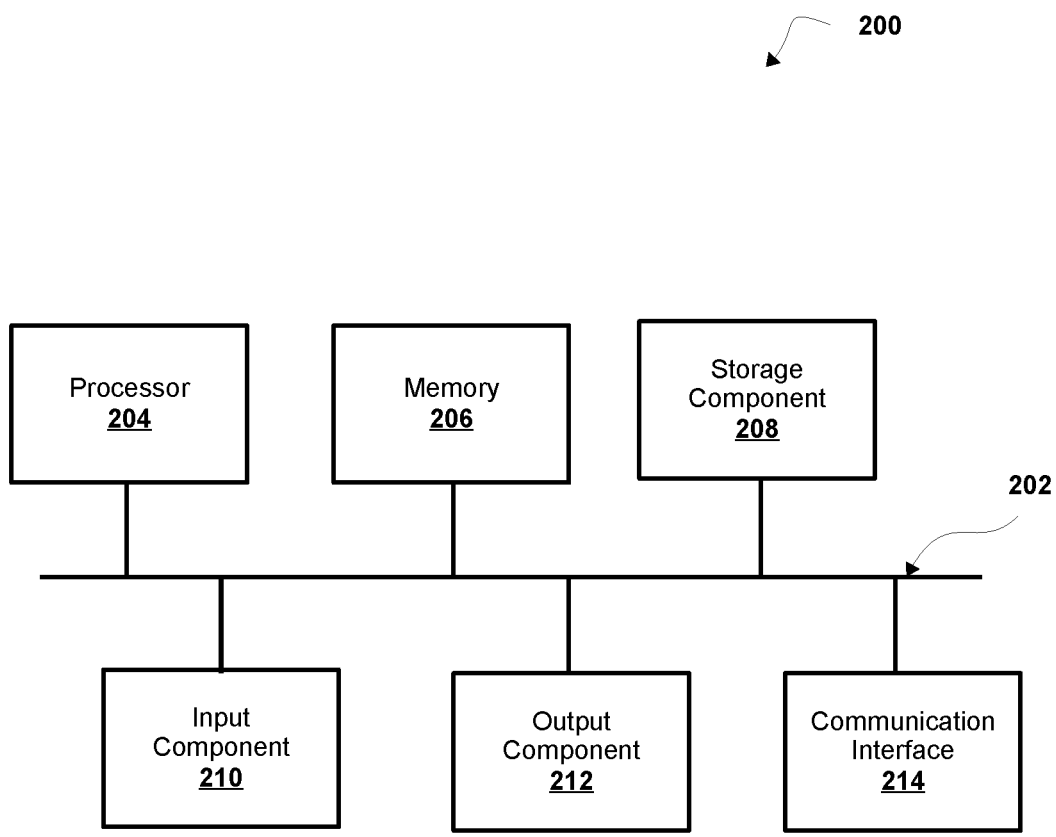
FIG. 2 is a diagram of a non-limiting embodiment of components of one or more devices of FIG. 1.

Referring now to FIG. 2, FIG. 2 is a diagram of example components of a device 200. Device 200 may correspond to model management system 102, user device 104, merchant system 106, issuer system 108, and/or acquirer system 110 and/or one or more devices of model management system 102, user device 104, merchant system 106, issuer system 108, and/or acquirer system 110. In some non-limiting embodiments, model management system 102, user device 104, merchant system 106, issuer system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
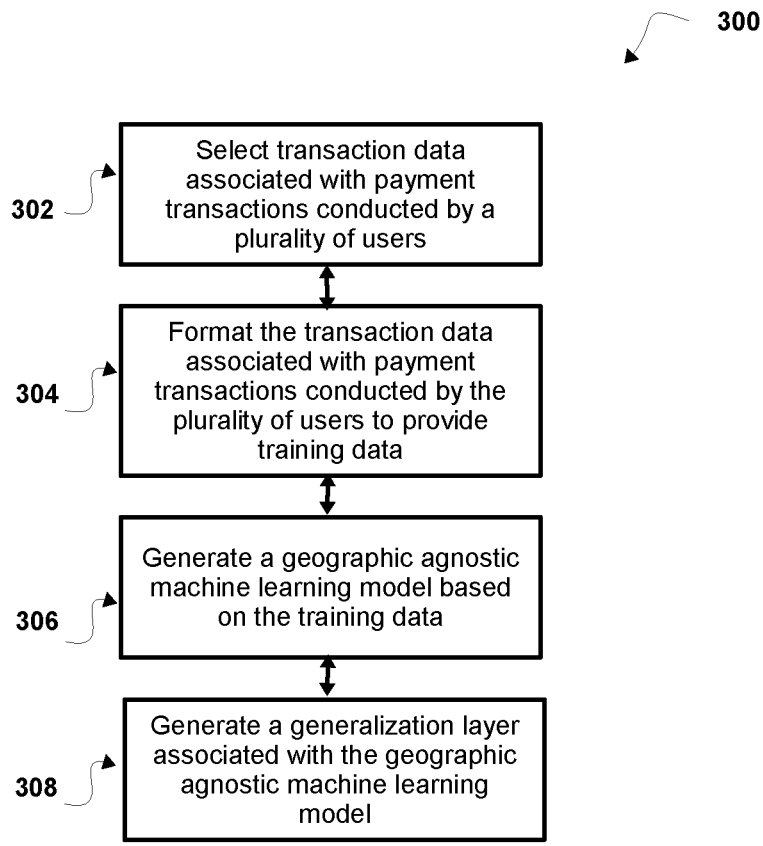
FIG. 3 is a flowchart of a non-limiting embodiment of a process for developing a geographic agnostic machine learning model.

Referring now to FIG. 3, FIG. 3 is a flowchart of a non-limiting embodiment of a process 300 for developing a geographic agnostic machine learning model. In some non-limiting embodiments, one or more of the steps of process 300 may be performed (e.g., completely, partially, etc.) by model management system 102 (e.g., one or more devices of model management system 102). In some non-limiting embodiments, one or more of the steps of process 300 may be performed (e.g., completely, partially, etc.) by another device or a group of devices separate from or including model management system 102, such as user device 104, merchant system 106, issuer system 108, and/or acquirer system 110.

As shown in FIG. 3, at step 302, process 300 includes selecting transaction data associated with payment transactions conducted by a plurality of users. For example, model management system 102 may select transaction data associated with payment transactions conducted by a plurality of users in one or more geographic areas (e.g., one or more countries, one or more cities, one or more zip codes, one or more towns, one or more markets, and/or the like). In some non-limiting embodiments, model management system 102 may select transaction data associated with payment transactions conducted by a first plurality of users. The transaction data may include first transaction data associated with payment transactions conducted by a first plurality of users in a first geographic area and second transaction data associated with payment transactions conducted by a second plurality of users in a second geographic area. In this way, model management system 102 may select the data to remove a bias of one or more particular geographic areas of the plurality of geographic areas that may otherwise be present in the set of training data.

In some non-limiting embodiments, the transaction data may represent an inherent distribution of a product type, a product color, monthly activity, relative spending, and/or other aspects of the payment transactions conducted by the plurality of users in the one or more geographic areas. In some non-limiting embodiments, model management system 102 may select data associated with payment transactions conducted by a plurality of users in one or more geographic areas (e.g., a plurality of geographic areas, a plurality of countries, markets) as a set of training data for a machine learning model. For example, model management system 102 may select data associated with payment transactions conducted by a plurality of users in all geographic areas of a plurality of geographic areas as the set of training data.

In some non-limiting embodiments, the transaction data associated with the payment transactions conducted by the plurality of users may include transaction data associated with a plurality of payment transactions. For example, the transaction data associated with the payment transactions may include transaction data (e.g., historical transaction data, first transaction data, first historical transaction data, and/or the like) associated with a plurality of payment transactions involving (e.g., conducted by) a user, a plurality of users, and/or the like. In some non-limiting embodiments, the transaction data may be associated with a plurality of payment transactions involving one or more accounts (e.g., a credit card account, a debit card account, and/or the like) of a user, a plurality of accounts of a plurality of users, and/or the like. In some non-limiting embodiments, the transaction data may be associated with a payment transaction (e.g., a payment transaction of a plurality of payment transactions) and/or a plurality of payment transactions. For example, the transaction data may be associated with a payment transaction involving a user and a merchant (e.g., a merchant associated with merchant system 106). In some non-limiting embodiments, a plurality of payment transactions may involve a plurality of users and a plurality of merchants, and each payment transaction of the plurality of payment transactions may involve a single user and a single merchant.

In some non-limiting embodiments, the transaction data associated with the payment transactions may include values of a plurality of data fields associated with the payment transactions. The values of the plurality of data fields may include values of one or more transaction amount data fields associated with an amount of the payment transaction (e.g., a cost associated with the payment transaction, a transaction amount, an overall transaction amount, a cost of one or more products involved in the payment transaction, and/or the like), values of one or more transaction time data fields associated with a time interval at which the payment transaction occurred (e.g., a time of day, a day of the week, a date of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), values of one or more transaction type data fields associated with a transaction type of the payment transaction (e.g., an online transaction, a card present transaction, a face-to-face transaction, an electronic commerce indicator, a settlement flag for a payment transaction, and/or the like), and/or the like.

Additionally or alternatively, the values of the plurality of data fields may include values of one or more product data fields associated with a product involved in a payment transaction (e.g., a product identifier, a type of product, a product platform, and/or the like), values of one or more currency data fields associated with a currency (e.g., a country of currency used in a payment transaction, a type of currency used in a payment transaction, a foreign exchange rate for a type of currency used in a payment transaction, an indication associated with C&S currency, an indication associated with C&S amount, and/or the like), values of one or more user identity data fields associated with an identity of the user (e.g., a unique identifier of the user, a name of the user, and/or the like), values of one or more user account data fields associated with an account of the user (e.g., an account identifier associated with the user, a PAN associated with a credit and/or debit account of the user, a token associated with a credit and/or debit account of the user, and/or the like), and/or the like. Additionally or alternatively, the values of the plurality of data fields may include values of one or more merchant identity data fields associated with an identity of the merchant (e.g., a unique identifier of the merchant, a name of the merchant, a country of the merchant, and/or the like), values of one or more merchant category data fields associated with at least one merchant category of the merchant (e.g., a code for a merchant category, a name of a merchant category, a type of a merchant category, and/or the like), values of one or more merchant account data fields associated with an account of the merchant (e.g., an account identifier associated with an account of the merchant, a PAN associated with an account of the merchant, a token associated with an account of the merchant, and/or the like), and/or the like. Additionally or alternatively, the values of the plurality of data fields may include values of one or more issuer identity data fields associated with the issuer that issued an account involved in a payment transaction (e.g., a unique identifier of the issuer, a name of the issuer, a country of an issuer, an issuer identification number (IIN) associated with the issuer, a bank identification number (BIN) associated with the issuer, and/or the like), and/or the like. Additionally or alternatively, the values of the plurality of data fields may include values of one or more acquirer identity data fields associated with the acquirer that issued an account of a merchant involved in a payment transaction (e.g., a unique identifier of the acquirer, a name of the acquirer, an acquirer identification number associated with the acquirer, a BIN associated with the acquirer, and/or the like), and/or the like.

In some non-limiting embodiments, the transaction data associated with the payment transactions may include feature data associated with one or more features associated with the payment transactions included in the transaction data. In some non-limiting embodiments, a feature may include a characteristic that is derived (e.g., created) based on one or more values of the plurality of data fields associated with the payment transactions included in the transaction data. For example, a feature may include a number of payment transactions involving an account conducted during a period of time. In another example, a feature may include a transaction amount of all payment transactions involving an account conducted during a period of time.

In some non-limiting embodiments, model management system 102 may receive the data associated with the payment transactions (e.g., historical transaction data, transaction data, historical transaction data, and/or the like). For example, model management system 102 may receive the data from user device 104, merchant system 106, issuer system 108, and/or acquirer system 110 (e.g., via network 112).

In some non-limiting embodiments, model management system 102 may select data associated with payment transactions conducted by a plurality of users that is to be formatted and then used as training data for a geographic agnostic machine learning model. For example, model management system 102 may select data associated with payment transactions conducted by a plurality of users during a time period (e.g., one or more months of a year, a window of one or more months of a year, an observation window of one or more months of a year, a prediction window of one or more months of a year, and/or the like).

In some non-limiting embodiments, model management system 102 may select data associated with payment transactions conducted by a first plurality of users in the geographic area and data associated with payment transactions conducted by a second plurality of users in the geographic area. In some non-limiting embodiments, the data associated with payment transactions conducted by the first plurality of users in the geographic area may be sampled at a greater rate than a rate at which the data associated with payment transactions conducted by the second plurality of users in the geographic area is sampled.

In some non-limiting embodiments, model management system 102 may select data associated with payment transactions conducted by a plurality of users in a first geographic area and data associated with payment transactions conducted by a plurality of users in a second geographic area. For example, model management system 102 may select data associated with payment transactions conducted by a first plurality of users in the first geographic area and data associated with payment transactions conducted by a second plurality of users in the second geographic area, where the first geographic area is different from the second geographic area.

As further shown in FIG. 3, at step 304, process 300 includes formatting the transaction data associated with payment transactions conducted by the plurality of users to provide training data. For example, model management system 102 may format the data associated with payment transactions conducted by the plurality of users in response to model management system 102 selecting the data. In some non-limiting embodiments, model management system 102 may format the data associated with payment transactions conducted by the plurality of users based on a parameter of (e.g., a variable to be used as an input to) a machine learning model.

In some non-limiting embodiments, model management system 102 may format the data by standardizing the data associated with payment transactions conducted by the plurality of users according to each geographic area of a plurality of geographic areas. For example, model management system 102 may format the data associated with payment transactions conducted by the plurality of users for the geographic area in which the payment transactions were conducted.

In some non-limiting embodiments, model management system 102 may normalize the transaction data associated with payment transactions conducted by the plurality of users by performing a normalization technique and/or a de-weighting technique on the transaction data. In this way, model management system 102 transforms features of the transaction data (e.g., derived characteristics created using the data, derived characteristics of users involved in payment transactions created using the data, and/or the like) by means of statistical techniques and stabilizes information bias associated with the data. By stabilizing information bias associated with the data, model management system 102 may reduce the effects of information bias by bringing the features on to the same scale and in a similar range of values. In some non-limiting embodiments, a normalization technique may include a Z-score technique, a binning technique, and/or a min-max normalization technique.

In some non-limiting embodiments, a Z-score technique preserves a range (e.g., a maximum range and a minimum range) and introduces a dispersion of a series (e.g., a standard deviation, a variance, and/or the like). If an input layer of a machine learning model (e.g., a geographic agnostic machine learning model) follows a Gaussian distribution, the features of the data may be converted to an N(0,1) distribution, and a comparison between series associated with the features of the transaction data may be easier to determine than if the input layer does not follow a Gaussian distribution.

In some non-limiting embodiments, a binning technique is a top-down splitting technique that works by sorting the data and portioning the data into a specified number of bins. In some non-limiting embodiments, the binning technique may be applied by an equal-width approach or an equal-frequency approach. Additionally or alternatively, each value of a bin may be replaced by a mean value of a bin or a median value of a bin.

In some non-limiting embodiments, a min-max normalization technique performs a linear transformation of an input layer of a machine learning model. Additionally or alternatively, the min-max normalization technique may preserve a relationship among values of the data. Additionally or alternatively, the min-max normalization technique may result in deviant values of the data if outlier values in the data are dominant.

In some non-limiting embodiments, the de-weighting technique may neutralize a weighting of attributes (e.g., dimensions of data) that are assumed to be relevant to a prediction or decision problem associated with a machine learning model (e.g., a geographic agnostic machine learning model). In some non-limiting embodiments, model management system 102 may perform rescaling of classification rates during training of a machine learning model.

In some non-limiting embodiments, model management system 102 may perform a de-weighting technique on transaction data associated with payment transactions conducted by the plurality of users based on one or more parameters associated with a result (e.g., a determination, a classification, a prediction, and/or the like) of a machine learning model. For example, model management system 102 may perform the de-weighting technique on transaction data associated with payment transactions conducted by the plurality of users based on a parameter (e.g., a classification rate) associated with whether an account is classified as an account that is associated with a user that travels between one geographic area and another geographic area, whether an account is classified as an account that is associated with a user that is likely to close the account within a predetermined period of time, and/or the like.

In one example, model management system 102 may perform a de-weighting technique by sampling a total number of accounts in a plurality of geographic areas and determining a classification rate for each of the plurality of geographic areas. Model management system 102 may re-scale the classification rate so that each geographic area is equally represented within the total number of accounts. Additionally, model management system 102 may re-scale the classification rate so that the classification rate is constant (e.g., a fixed amount). In this way, model management system 102 may re-scale the classification rate of each of the plurality of geographic areas to remove a bias that may be present based on a particular geographic area of the plurality of geographic areas.

In some non-limiting embodiments, model management system 102 may perform a de-weighting technique on transaction data associated with payment transactions conducted by the plurality of users based on model management system 102 performing a normalization technique on the data. For example, model management system 102 may perform a de-weighting technique on the transaction data associated with payment transactions conducted by the plurality of users after model management system 102 performs a normalization technique on the transaction data. In some non-limiting embodiments, the transaction data upon which model management system 102 performs the de-weighting technique may be the same or different from the transaction data upon which model management system 102 performs the normalization technique.

In some non-limiting embodiments, model management system 102 may perform a normalization technique and/or a de-weighting technique on the transaction data associated with payment transactions conducted by the plurality of users based on a mode associated with model management system 102. For example, model management system 102 may perform the normalization technique and/or the de-weighting technique on the data associated with payment transactions conducted by the plurality of users based on a training mode associated with model management system 102. In such an example, model management system 102 may perform the normalization technique and/or the de-weighting technique on the transaction data when model management system 102 is in the training mode.

As further shown in FIG. 3, at step 306, process 300 includes generating a geographic agnostic machine learning model based on the training data. For example, model management system 102 may generate a geographic agnostic machine learning model based on the training data.

In some non-limiting embodiments, model management system 102 may generate the geographic agnostic machine learning model based on one or more geographic areas in which payment transactions were conducted by a plurality of users. For example, model management system 102 may generate a geographic agnostic machine learning model based on training data, where the training data is based on transaction data associated with payment transactions conducted by the plurality of users in the one or more geographic areas.

In some non-limiting embodiments, the geographic agnostic machine learning model may be designed to receive, as an input, transaction data associated with one or more payment transactions involving one or more accounts, and provide, as an output, a prediction as to a category of the one or more accounts. For example, the geographic agnostic machine learning model may receive the input and may provide the output that includes a prediction of a category of a plurality of categories (e.g., a category associated with an account of a plurality of categories associated with a plurality of accounts) to which the account should be assigned.

In some non-limiting embodiments, the geographic agnostic machine learning model may be designed to receive, as an input, one or more variables associated with a plurality of payment transactions involving an account, which may be identified as predictor variables, and provide, as an output, a prediction (e.g., a probability, a binary output, a yes-no output, a score, a prediction score, and/or the like) that the account should be assigned to a category of a plurality of categories.

In some non-limiting embodiments, model management system 102 may receive transaction data associated with a plurality of payment transactions from user device 104, merchant system 106, issuer system 108, and/or acquirer system 110. Model management system 102 may analyze the transaction data to generate the geographic agnostic machine learning model based on receiving the transaction data. In some non-limiting embodiments, model management system 102 may generate the geographic agnostic machine learning model by generating a rule for the geographic agnostic machine learning model based on the transaction data (e.g., historical transaction data) associated with a plurality of payment transactions. In some non-limiting embodiments, historical transaction data may include transaction data associated with one or more payment transactions that have been assigned to a category.

In some non-limiting embodiments, model management system 102 may process transaction data to obtain training data for the geographic agnostic machine learning model. For example, model management system 102 may process the transaction data to change the transaction data into a format that may be analyzed (e.g., by model management system 102) to generate a geographic agnostic machine learning model. The transaction data that is changed may be referred to as training data. In some non-limiting embodiments, model management system 102 may process the transaction data to obtain the training data based on receiving the transaction data. Additionally or alternatively, model management system 102 may process the transaction data to obtain the training data based on model management system 102 receiving an indication that model management system 102 is to process the transaction data from a user of model management system 102, such as when model management system 102 receives an indication to create a geographic agnostic machine learning model for a geographic area (e.g., a market) corresponding to the transaction data.

In some non-limiting embodiments, model management system 102 may process the transaction data by determining one or more variables (e.g., a variable representative of a characteristic, a variable associated with a feature that is representative of a characteristic, and/or the like) based on the transaction data. The one or more variables may include one or more metrics, associated with a payment transaction, which may be derived based on the transaction data. The one or more variables may be analyzed to generate a geographic agnostic machine learning model. In one example, the one or more variables may include variables associated with transaction data associated with payment transactions conducted in a geographic area.

In some non-limiting embodiments, model management system 102 may analyze the training data to generate the geographic agnostic machine learning model. For example, model management system 102 may use machine learning techniques to analyze the training data to generate the geographic agnostic machine learning model. In some non-limiting embodiments, generating the geographic agnostic machine learning model (e.g., based on training data obtained from historical transaction data) may be referred to as training the geographic agnostic machine learning model. In some non-limiting embodiments, the machine learning techniques may include supervised techniques, unsupervised techniques, and/or the like. In some non-limiting embodiments, the geographic agnostic machine learning model may include a model that is specific to a particular geographic area, a particular set of geographic areas, a particular group of accounts (e.g., accounts associated with users) involved in payment transactions in one or more geographic areas, and/or the like. In some non-limiting embodiments, model management system 102 may generate one or more geographic agnostic machine learning models for one or more geographic areas and/or a particular group of accounts involved in payment transactions.

Additionally or alternatively, when analyzing the training data, model management system 102 may identify one or more variables (e.g., one or more independent variables) as one or more predictor variables that may be used to make a prediction (e.g., when analyzing the training data). In some non-limiting embodiments, values of the one or more predictor variables may be inputs to the geographic agnostic machine learning model. In some non-limiting embodiments, the predictor variables may include one or more of the variables, as discussed above, which have a significant impact (e.g., an impact satisfying a threshold) on a probability that an account is to be assigned to a category as determined by model management system 102 using the geographic agnostic machine learning model.

In some non-limiting embodiments, model management system 102 may validate the geographic agnostic machine learning model. For example, model management system 102 may validate the geographic agnostic machine learning model after model management system 102 generates the geographic agnostic machine learning model. In some non-limiting embodiments, model management system 102 may validate the geographic agnostic machine learning model based on a portion of the training data to be used for validation. For example, model management system 102 may partition the training data into a first portion and a second portion, where the first portion may be used to generate the geographic agnostic machine learning model, as described above. In this example, the second portion of the training data (e.g., the validation data) may be used to validate the geographic agnostic machine learning model. In some non-limiting embodiments, if model management system 102 does not validate the geographic agnostic machine learning model, then model management system 102 may generate additional geographic agnostic machine learning models.

As further shown in FIG. 3, at step 308, process 300 includes generating a generalization layer associated with the geographic agnostic machine learning model. For example, model management system 102 may generate a generalization layer associated with the geographic agnostic machine learning model based on data associated with macro-economic factors of the first geographic area and data associated with macro-economic factors of the second geographic area.

In some non-limiting embodiments, model management system 102 may optimize the geographic agnostic machine learning model. For example, model management system 102 may optimize the geographic agnostic machine learning model after generating the machine learning model. In some non-limiting embodiments, model management system 102 may optimize parameters of the geographic agnostic machine learning model to get the best candidate model by adjusting a learn rate of the geographic agnostic machine learning model, a number of trees of the geographic agnostic machine learning model, a depth of trees of the geographic agnostic machine learning model, a subsample fraction of the geographic agnostic machine learning model, and/or influence trimming of the geographic agnostic machine learning model. In some non-limiting embodiments, model management system 102 may determine a sensitivity of the geographic agnostic machine learning model based on one or more variables (e.g., predictor variables). Additionally or alternative, model management system 102 may determine a set of predictor variables that provides a least complicated model that has optimal performance.

In some non-limiting embodiments, model management system 102 may communicate data associated with the geographic agnostic machine learning model after optimizing the geographic agnostic machine learning model. For example, model management system 102 may transmit data associated with the geographic agnostic machine learning model (e.g., a file that includes the geographic agnostic machine learning model) after optimizing the geographic agnostic machine learning model. In some non-limiting embodiments, model management system 102 may use the geographic agnostic machine learning model to determine a classification of an account. For example, model management system 102 may use the geographic agnostic machine learning model to determine the classification of the account independent of a geographic area of which the account is associated.

In some non-limiting embodiments, model management system 102 may generate the generalization layer based on data associated with macro-economic factors of one or more geographic areas. For example, model management system 102 may generate a generalization layer that includes features that are based on data associated with macro-economic factors of a first geographic area and data associated with macro-economic factors of a second geographic area. The first geographic area and/or the second geographic area may be a geographic area in which payment transactions were conducted by a plurality of users, and transaction data associated with the payment transactions conducted by the plurality of users in the geographic area may have been used to provide geographic agnostic transaction data associated with payment transactions. Training data used to train the geographic agnostic machine learning model may include the geographic agnostic transaction data associated with payment transactions. In some non-limiting embodiments, model management system 102 may obtain the data associated with macro-economic factors of one or more geographic areas from a publicly available data source, such as a website associated with a geographic area (e.g., a portal of a country, a world bank webpage, and/or the like).

In some non-limiting embodiments, the data associated with the macro-economic factors of one or more geographic areas may include publicly available data associated with the one or more geographic areas, such as social, economic and/or demographic data for the one or more geographic areas. For example, the data associated with the macro-economic factors of one or more geographic areas may include data associated with a population of a geographic area (e.g., a number of people living in a geographic area), data associated with an amount of a population of a geographic area that has a financial account (e.g., a bank account, a credit card account, and/or the like), data associated with regulations (e.g., credit limit regulations) of a geographic area, data associated with interest rates in the geographic area, data associated with gross domestic product (GDP) of a geographic area (e.g., GDP per capita of a geographic area), average total transaction amount of payment transactions conducted during a period of time (e.g., average total transaction amount of payment transactions conducted using a credit card during a period of time), average number of payment transactions conducted during a period of time (e.g., average number of payment transactions conducted using a credit card during a period of time), data associated with a number of public holidays in a geographic area, data associated with a foreign exchange rate of a geographic area (e.g., a country) with another geographic area, data associated with smartphone penetration in a geographic area, and/or the like.

In some non-limiting embodiments, model management system 102 may apply an input to the generalization layer (e.g., overlay the features of generalization layer to an input) to provide an output of the generalization layer and model management system 102 may apply the output of the generalization layer as an input to the geographic agnostic machine learning model.

In some non-limiting embodiments, model management system 102 may apply an input to the generalization layer based on a mode associated with model management system 102. For example, model management system 102 may apply an input to the generalization layer based on an execution mode associated with model management system 102. In such an example, model management system 102 may apply an input to the generalization layer when model management system 102 is in the training mode. In some non-limiting embodiments, model management system 102 may switch between a training mode and an execution mode automatically. In some non-limiting embodiments, model management system 102 may switch between a training mode and an execution mode based on a manual input.

FIGS. 4A-4G are diagrams of an overview of a non-limiting embodiment of an implementation 400 relating to a process for developing a geographic agnostic machine learning model. As shown in FIGS. 4A-4G, implementation 400 may include model management system 402. In some non-limiting embodiments, model management system 402 may be the same or similar to model management system 102.

Figure 4A:
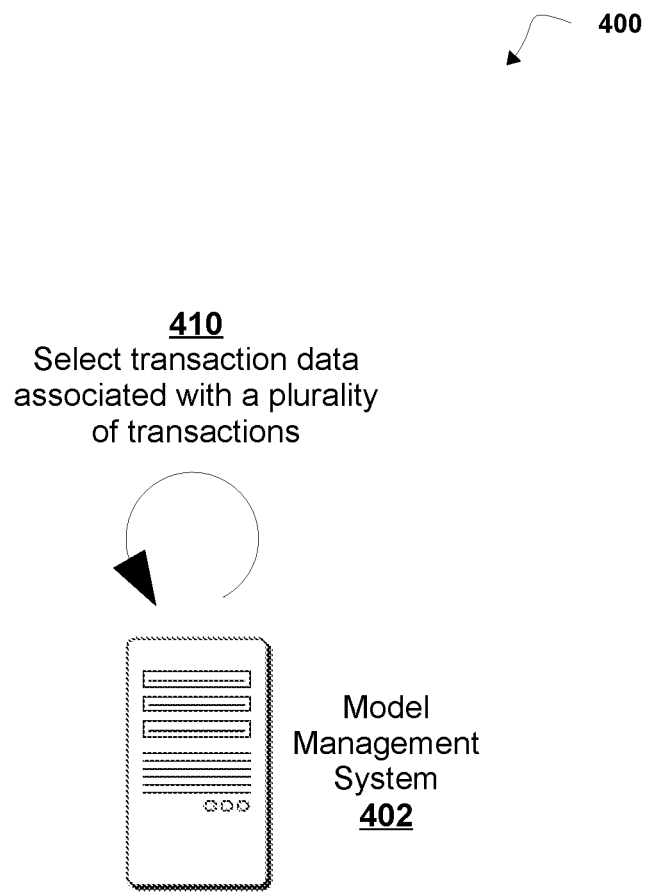
FIGS. 4A-4G are diagrams of a non-limiting embodiment of a process according to an embodiment of the present disclosure.

As shown by reference number 410 in FIG. 4A, model management system 402 may select transaction data associated with a plurality of transactions. For example, model management system 402 may select transaction data associated with a plurality of transactions based on payment transactions conducted by a plurality of users in one or more geographic areas. In some non-limiting embodiments, model management system 402 may select transaction data associated with payment transactions conducted by a first plurality of users. The transaction data may include first transaction data associated with payment transactions conducted by a first plurality of users in a first geographic area and second transaction data associated with payment transactions conducted by a second plurality of users in a second geographic area.

Figure 4B:
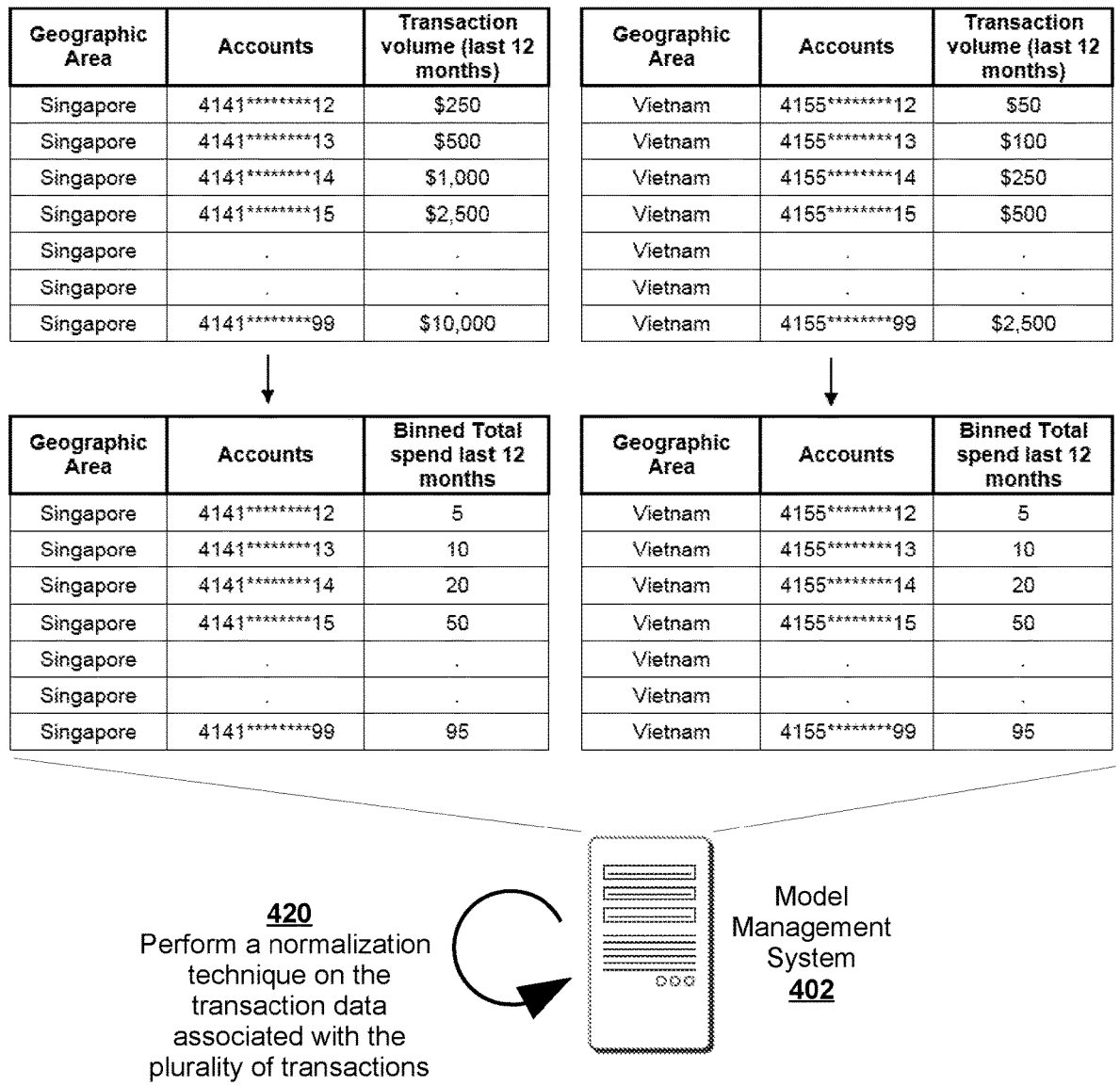

As shown by reference number 420 in FIG. 4B, model management system 402 may perform a normalization technique on the transaction data associated with a plurality of transactions. For example, model management system 402 may transform features of the transaction data (e.g., derived characteristics created using the data and and/or the like) by means of statistical techniques to stabilize information bias associated with the data.

Figure 4C:
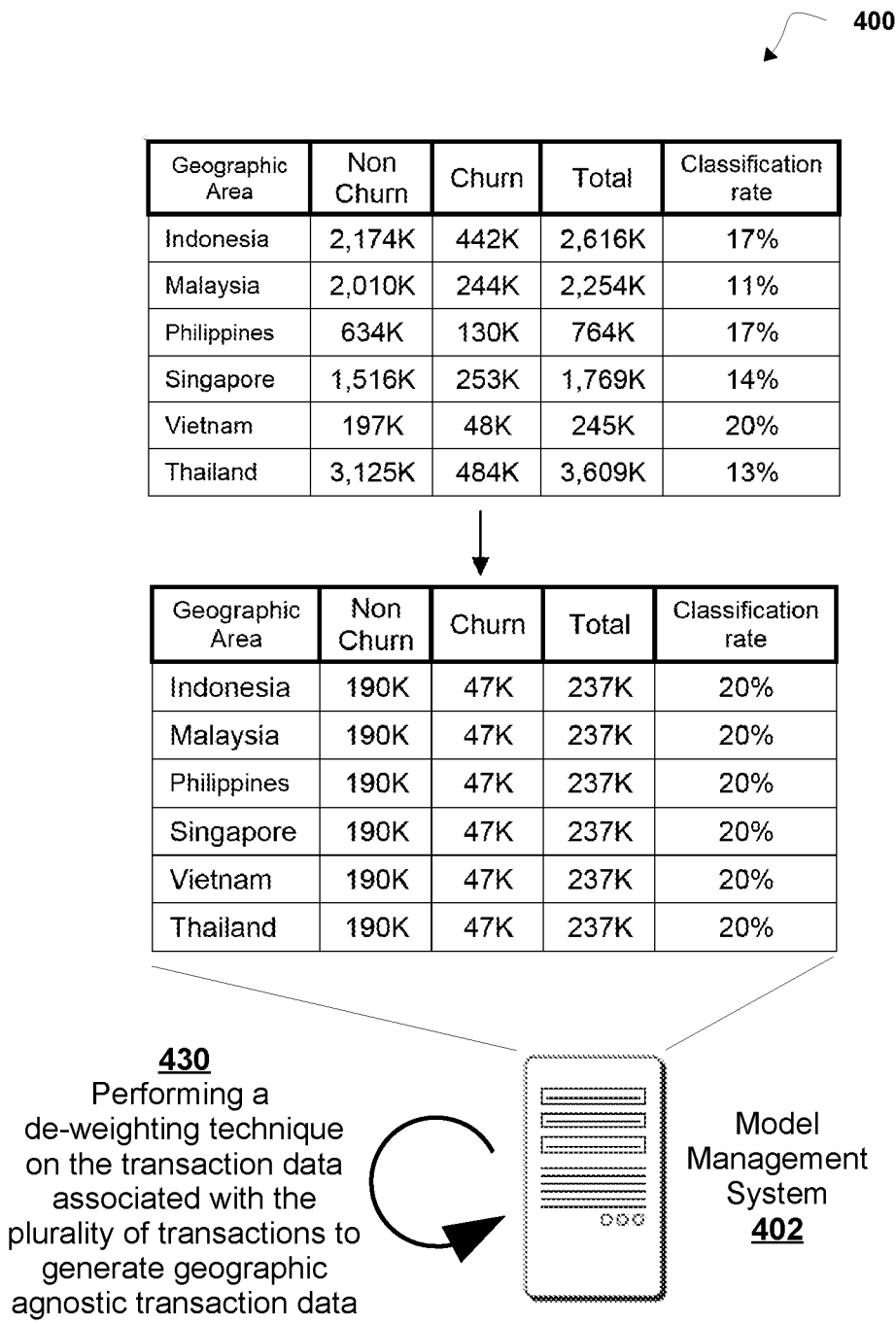

As shown by reference number 430 in FIG. 4C, model management system 402 may perform a de-weighting technique on the transaction data associated with the plurality of transactions to generate geographic agnostic data. For example, model management system 402 may perform the de-weighting technique on the transaction data based on performance of a normalization technique by model management system 402 on the transaction data.

Figure 4D:
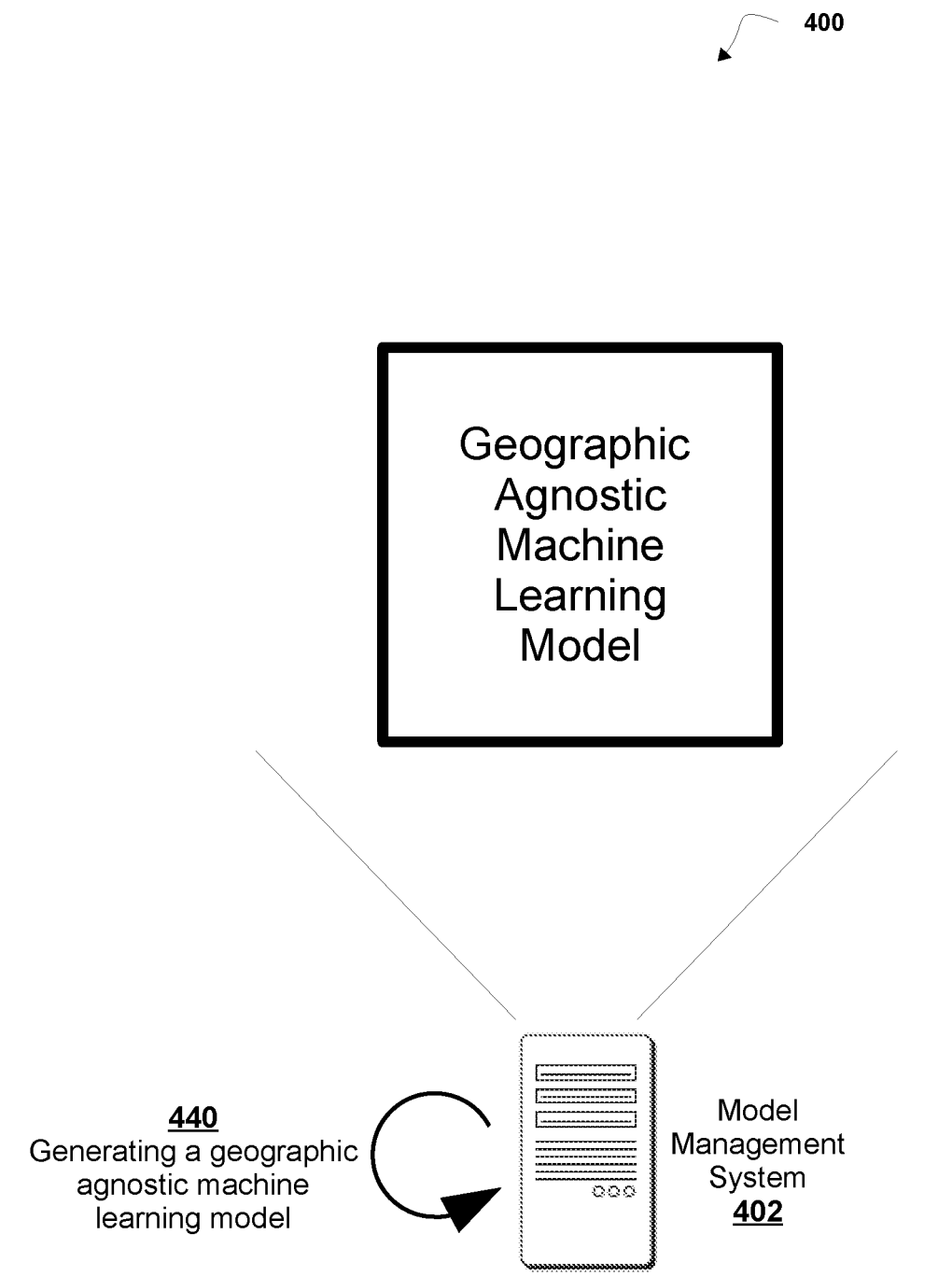

As shown by reference number 440 in FIG. 4D, model management system 402 may generate a geographic agnostic machine learning model. For example, model management system 402 may generate the geographic agnostic machine learning model based on training data. The training data may be based on transaction data associated with payment transactions conducted by a plurality of users in one or more geographic areas. The geographic agnostic machine learning model may receive, as input, transaction data associated with one or more payment transactions involving one or more accounts and provide, as output, a prediction as to a category of the one or more accounts to which the account should be assigned.

Figure 4E:
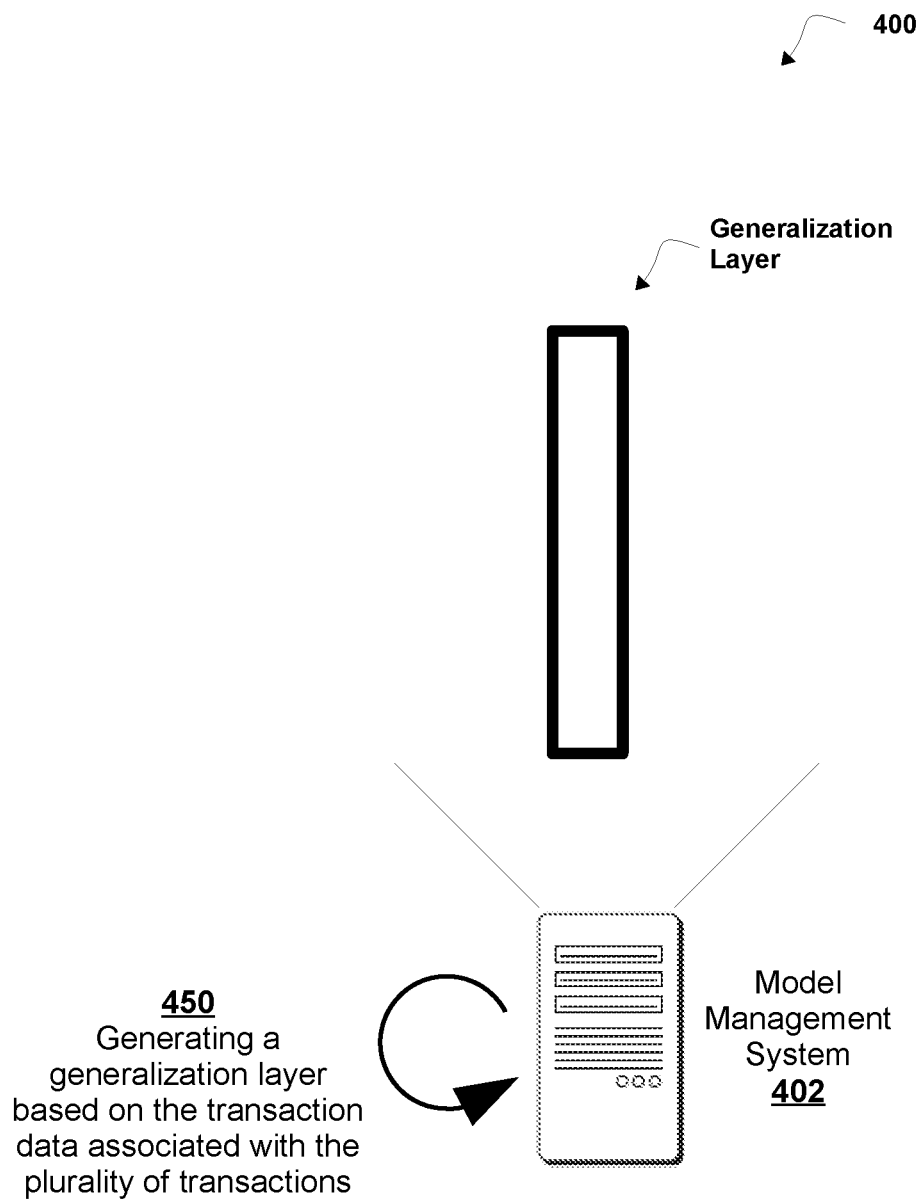

As shown by reference number 450 in FIG. 4E, model management system 402 may generate a generalization layer based on the transaction data associated with the plurality of transactions. For example, model management system 402 may generate a generalization layer including features that are based on data associated with macro-economic factors (e.g., of macro-economic factors of a first geographic area and macro-economic factors of a second geographic area). In some non-limiting embodiments, the macro-economic factors may include publically available data associated with one or more geographic areas.

Figure 4F:
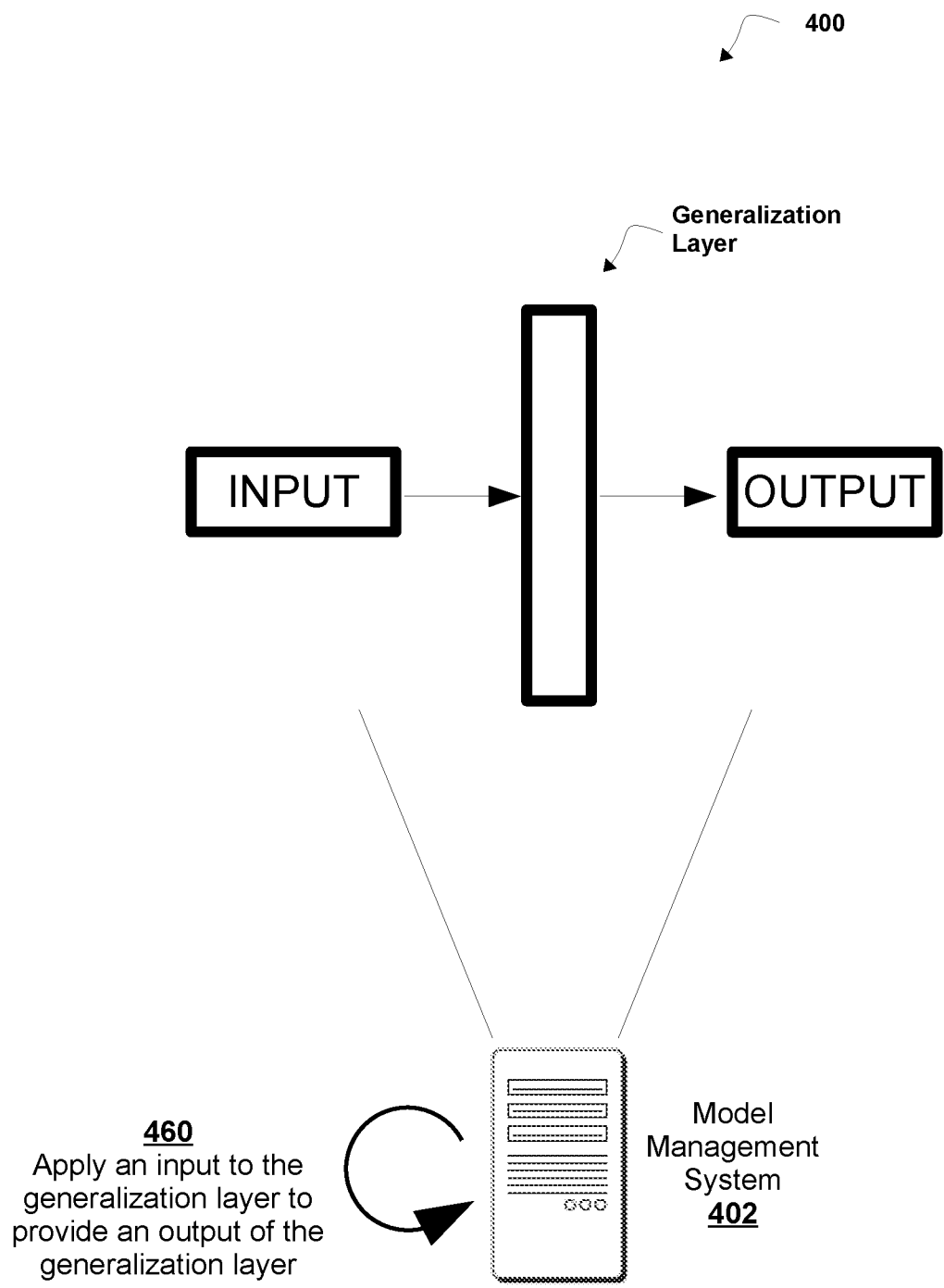
Figure 4G:
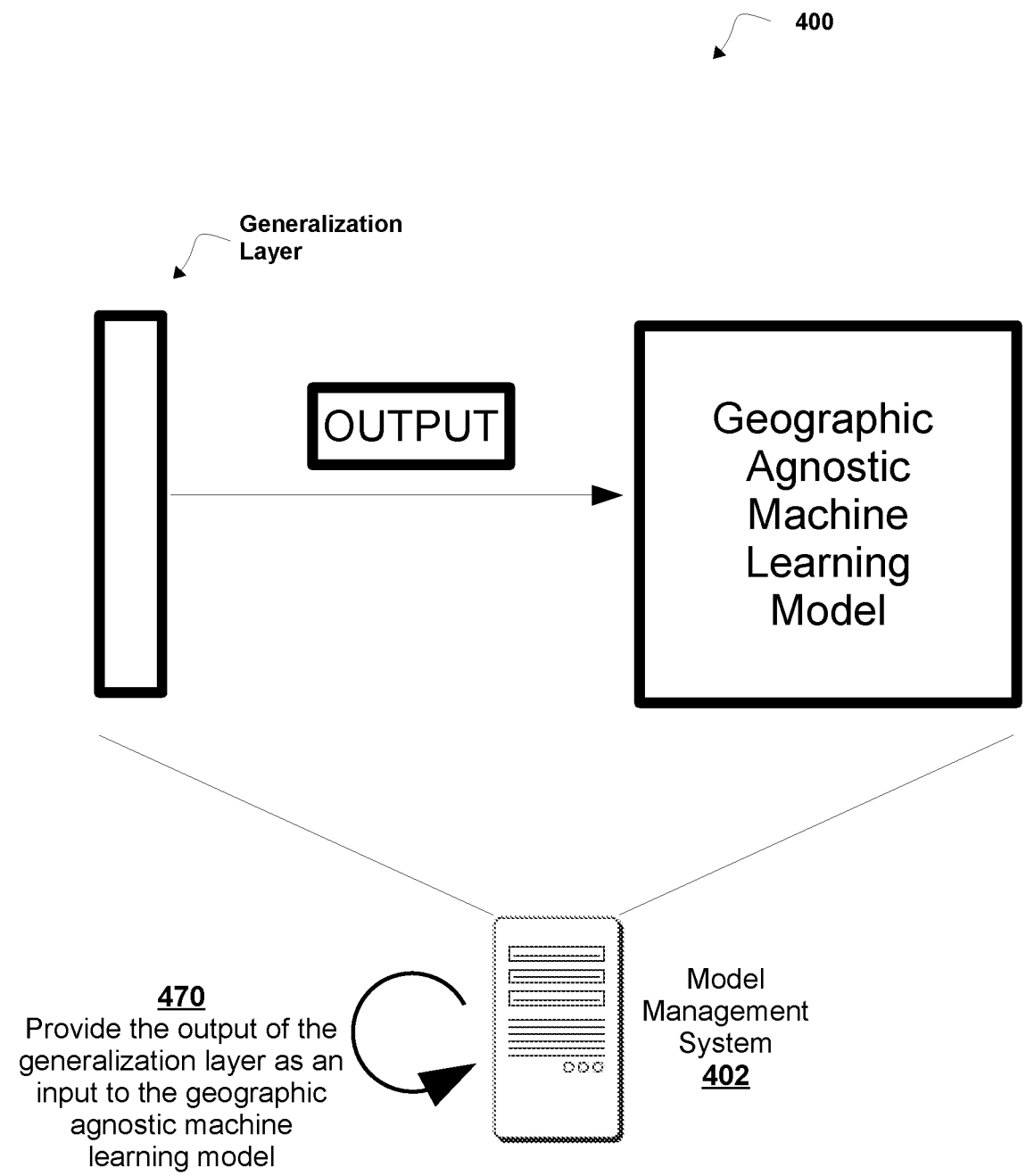

As shown by reference number 460 in FIG. 4F, model management system 402 may apply an input to the generalization layer to provide an output of the generalization layer. For example, model management system 402 may apply an input to the generalization layer (e.g., overlay the features of the generalization layer onto an input) to provide an output of the generalization layer. In some non-limiting embodiments, model management system 402 may apply an input to the generalization layer based on model management system 402 being in a training mode or a management mode. As shown by reference number 470 in FIG. 4G, model management system 402 may provide the output of the generalization layer as an input to the geographic agnostic machine learning model.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements. For example, it is to be understood that the present disclosure contemplates that, to the extent possible, one or more aspects of any embodiment can be combined with one or more aspects of any other embodiment.

What is claimed is:

1. A system for developing a geographic agnostic machine learning model, the system comprising:
at least one processor programmed or configured to:
select transaction data associated with payment transactions conducted by a plurality of users, wherein the transaction data comprises first transaction data associated with payment transactions conducted by a first plurality of users in a first geographic area and second transaction data associated with payment transactions conducted by a second plurality of users in a second geographic area;
format the first transaction data associated with payment transactions conducted by the first plurality of users in the first geographic area and the second transaction data associated with payment transactions conducted by the second plurality of users in the second geographic area to provide geographic agnostic transaction data associated with payment transactions;
wherein, when formatting the first transaction data associated with payment transactions conducted by the first plurality of users in the first geographic area and the second transaction data associated with payment transactions conducted by the second plurality of users in the second geographic area, the at least one processor is programmed or configured to:
normalize the first transaction data associated with payment transactions conducted by the first plurality of users in the first geographic area and the second transaction data associated with payment transactions conducted by the second plurality of users in the second geographic area;
wherein, when normalizing the first transaction data associated with payment transactions conducted by the first plurality of users in the first geographic area and the second transaction data associated with payment transactions conducted by the second plurality of users in the second geographic area, the at least one processor is programmed or configured to:
perform a de-weighting technique on the first transaction data associated with payment transactions conducted by the first plurality of users in the first geographic area and the second transaction data associated with payment transactions conducted by the second plurality of users in the second geographic area;
wherein, when performing the de-weighting technique, the at least one processor is programmed or configured to:
perform the de-weighting technique based on:
a parameter associated with whether an account is classified as an account that is associated with a user that travels between one geographic area and another geographic area, or
a parameter associated with whether an account is classified as an account that is associated with a user that is likely to close the account within a predetermined period of time;
generate a geographic agnostic machine learning model using training data, wherein the training data comprises the geographic agnostic transaction data associated with payment transactions, and wherein the geographic agnostic machine learning model is configured to provide an output that includes a prediction that an account associated with an input should be assigned to a category of a plurality of categories;
generate a generalization layer based on data associated with macro-economic factors of the first geographic area and data associated with macro-economic factors of the second geographic area;
apply an input to the generalization layer to provide an output of the generalization layer; and
provide the output of the generalization layer as an input to the geographic agnostic machine learning model.

2. The system of claim 1, wherein the at least one processor is further programmed or configured to:
determine a classification of the input using the geographic agnostic machine learning model.

3. The system of claim 1, wherein the at least one processor is further programmed or configured to:
optimize the geographic agnostic machine learning model after generating the geographic agnostic machine learning model.

4. The system of claim 1, wherein, when normalizing the first transaction data associated with payment transactions conducted by the first plurality of users in the first geographic area and the second transaction data associated with payment transactions conducted by the second plurality of users in the second geographic area, the at least one processor is programmed or configured to:
perform a normalization technique on the first transaction data associated with payment transactions conducted by the first plurality of users in the first geographic area and the second transaction data associated with payment transactions conducted by the second plurality of users in the second geographic area.

5. The system of claim 1, wherein, when normalizing the first transaction data associated with payment transactions conducted by the first plurality of users in the first geographic area and the second transaction data associated with payment transactions conducted by the second plurality of users in the second geographic area, the at least one processor is programmed or configured to:
normalize feature data associated with one or more features associated with payment transactions conducted by the first plurality of users in the first geographic area and feature data associated with one or more features associated with payment transactions conducted by the second plurality of users in the second geographic area.

6. A computer program product for developing a geographic agnostic machine learning model, the computer program product comprising at least one non-transitory computer-readable medium including one or more instructions that, when executed by at least one processor, cause the at least one processor to:
select transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area;
format the first transaction data associated with payment transactions conducted by the first plurality of users in the first geographic area and the second transaction data associated with payment transactions conducted by the second plurality of users in the second geographic area to provide geographic agnostic transaction data associated with payment transactions;
wherein, the one or more instructions that cause the at least one processor to format the first transaction data associated with payment transactions conducted by the first plurality of users in the first geographic area and the second transaction data associated with payment transactions conducted by the second plurality of users in the second geographic area, cause the at least one processor to:
normalize the first transaction data associated with payment transactions conducted by the first plurality of users in the first geographic area and the second transaction data associated with payment transactions conducted by the second plurality of users in the second geographic area;
wherein, the one or more instructions that cause the at least one processor to normalize the first transaction data associated with payment transactions conducted by the first plurality of users in the first geographic area and the second transaction data associated with payment transactions conducted by the second plurality of users in the second geographic area, cause the at least one processor to:
perform a de-weighting technique on the first transaction data associated with payment transactions conducted by the first plurality of users in the first geographic area and the second transaction data associated with payment transactions conducted by the second plurality of users in the second geographic area;
wherein, the one or more instructions that cause the at least one processor to perform the de-weighting technique, cause the at least one processor to:
perform the de-weighting technique based on:
a parameter associated with whether an account is classified as an account that is associated with a user that travels between one geographic area and another geographic area, or
a parameter associated with whether an account is classified as an account that is associated with a user that is likely to close the account within a predetermined period of time;

generate a geographic agnostic machine learning model using training data, wherein the training data comprises the geographic agnostic transaction data associated with payment transactions, and wherein the geographic agnostic machine learning model is configured to provide an output that includes a prediction that an account associated with an input should be assigned to a category of a plurality of categories;

generate a generalization layer based on data associated with macro-economic factors of the first geographic area and data associated with macro-economic factors of the second geographic area;

apply an input to the generalization layer to provide an output of the generalization layer; and provide the output of the generalization layer as an input to the geographic agnostic machine learning model.

7. The computer program product of claim 6, wherein the one or more instructions further cause the at least one processor to:

optimize the geographic agnostic machine learning model after generating the geographic agnostic machine learning model.

8. The computer program product of claim 6, wherein the one or more instructions that cause the at least one processor to normalize the first transaction data associated with payment transactions conducted by the first plurality of users in the first geographic area and the second transaction data associated with payment transactions conducted by the second plurality of users in the second geographic area cause the at least one processor to:

perform a normalization technique on the first transaction data associated with payment transactions conducted by the first plurality of users in the first geographic area and the second transaction data associated with payment transactions conducted by the second plurality of users in the second geographic area.

9. The computer program product of claim 6, wherein the one or more instructions that cause the at least one processor to normalize the first transaction data associated with payment transactions conducted by the first plurality of users in the first geographic area and the second transaction data associated with payment transactions conducted by the second plurality of users in the second geographic area, cause the at least one processor to:

normalize feature data associated with one or more features associated with payment transactions conducted by the first plurality of users in the first geographic area and feature data associated with one or more features associated with payment transactions conducted by the second plurality of users in the second geographic area.

10. A computer-implemented method for developing a geographic agnostic machine learning model, the method comprising:

selecting, with at least one processor, transaction data associated with payment transactions conducted by a first plurality of users, wherein the transaction data comprises first transaction data associated with payment transactions conducted by a first plurality of users in a first geographic area and second transaction data associated with payment transactions conducted by a second plurality of users in a second geographic area;

formatting, with at least one processor, the first transaction data associated with payment transactions conducted by the first plurality of users in the first geographic area and the second transaction data associated with payment transactions conducted by the second plurality of users in the second geographic area to provide training data;

wherein formatting the first transaction data associated with payment transactions conducted by the first plurality of users in the first geographic area and the second transaction data associated with payment transactions conducted by the second plurality of users in the second geographic area comprises:

normalizing the first transaction data associated with payment transactions conducted by the first plurality of users in the first geographic area and the second transaction data associated with payment transactions conducted by the second plurality of users in the second geographic area;

wherein normalizing the first transaction data associated with payment transactions conducted by the first plurality of users in the first geographic area and the second transaction data associated with payment transactions conducted by the second plurality of users in the second geographic area comprises:

performing a de-weighting technique on the first transaction data associated with payment transactions conducted by the first plurality of users in the first geographic area and the second transaction data associated with payment transactions conducted by the second plurality of users in the second geographic area;

wherein performing the de-weighting technique comprises:

performing the de-weighting technique based on:
a parameter associated with whether an account is classified as an account that is associated with a user that travels between one geographic area and another geographic area, or
a parameter associated with whether an account is classified as an account that is associated with a user that is likely to close the account within a predetermined period of time;

generating, with at least one processor, a geographic agnostic machine learning model using the training data, wherein the geographic agnostic machine learning model is configured to provide an output that includes a prediction that an account associated with an input should be assigned to a category of a plurality of categories; and generating a generalization layer based on data associated with macro-economic factors of the first geographic area and data associated with macro-economic factors of the second geographic area.

11. The computer-implemented method of claim 10, wherein normalizing the first transaction data associated with payment transactions conducted by the first plurality of users in the first geographic area and the second transaction data associated with payment transactions conducted by the second plurality of users in the second geographic area comprises:

performing a normalization technique on the first transaction data associated with payment transactions conducted by the first plurality of users in the first geographic area and the second transaction data associated with payment transactions conducted by the second plurality of users in the second geographic area, wherein the normalization technique comprises:
a Z-score technique,
a binning technique,
a min-max normalization technique, or
any combination thereof.

12. The computer-implemented method of claim 10, wherein normalizing the first transaction data associated with payment transactions conducted by the first plurality of users in the first geographic area and the second transaction data associated with payment transactions conducted by the second plurality of users in the second geographic area comprises:

normalizing one or more features associated with payment transactions conducted by the first plurality of users in the first geographic area and one or more features associated with payment transactions conducted by the second plurality of users in the second geographic area.

13. The computer-implemented method of claim 10, further comprising:

optimizing the geographic agnostic machine learning model after generating the geographic agnostic machine learning model.

14. The computer-implemented method of claim 10, further comprising:

applying an input to the generalization layer to provide an output of the generalization layer; and providing the output of the generalization layer as an input to the geographic agnostic machine learning model.

\* \* \* \* \*